United States Patent [19]
Klingelhofer

[11] 3,807,797
[45] Apr. 30, 1974

[54] SEAT CONSTRUCTION

[75] Inventor: Friedrich Gerd Klingelhofer, Remscheid, Germany

[73] Assignee: Fritz Keiper, Remscheid-Hasten, Germany

[22] Filed: July 17, 1972

[21] Appl. No.: 272,660

[30] Foreign Application Priority Data
July 16, 1971   Germany............................ 2135600

[52] U.S. Cl. ............................................ 297/362
[51] Int. Cl............................................. A47c 1/024
[58] Field of Search ............................ 297/362–372

[56] References Cited
UNITED STATES PATENTS

| | | | |
|---|---|---|---|
| 3,401,979 | 9/1968 | Putsch ................................. | 297/362 |
| 3,309,139 | 3/1967 | Turner et al......................... | 297/367 |
| 2,941,583 | 6/1960 | Tischler .............................. | 297/369 |
| 3,432,881 | 3/1969 | Putsch et al. ....................... | 297/366 |
| 3,667,804 | 6/1972 | Yasui et al.......................... | 297/366 |

FOREIGN PATENTS OR APPLICATIONS

| | | | |
|---|---|---|---|
| 1,296,060 | 5/1962 | France................................. | 297/367 |
| 1,282,176 | 12/1961 | France................................. | 297/370 |

*Primary Examiner*—Paul R. Gilliam
*Attorney, Agent, or Firm*—Michael S. Striker

[57] ABSTRACT

A seat member and backrest member are connected by mounting means mounting the latter on the former with freedom of angular displacement relative thereto. The mounting means includes a ring gear on one of the members and having inwardly directed teeth, and a spur gear provided on the other member received within the ring gear and having outwardly directed teeth which mesh with those of the ring gear. The outer diameter of the spur gear is smaller than the root diameter of the ring gear by at least the height of one tooth and of the number of inwardly directed teeth differ from the number of outwardly directed teeth by at least one. An internal chamber is provided in one of the gears and a journalling member is accommodated with radial clearance in the chamber and movable radially therein. It is smaller than the interior dimension of the chamber by at least the difference between the diameters of the gears. A pivot is provided on one of the gears and has a portion journalled in the journalling element. A selectively operable locking arrangement is provided, including a plurality of wedge-shaped locking elements located in the chamber in the radial clearance and a handle is provided for effecting movement of the locking elements between locking and unlocking positions.

11 Claims, 4 Drawing Figures

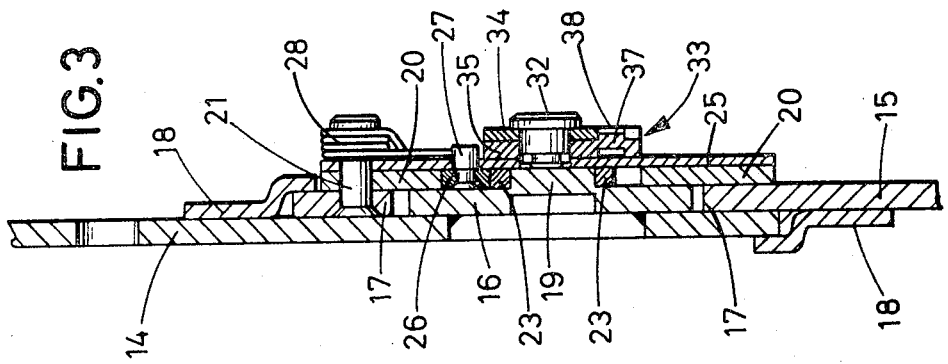
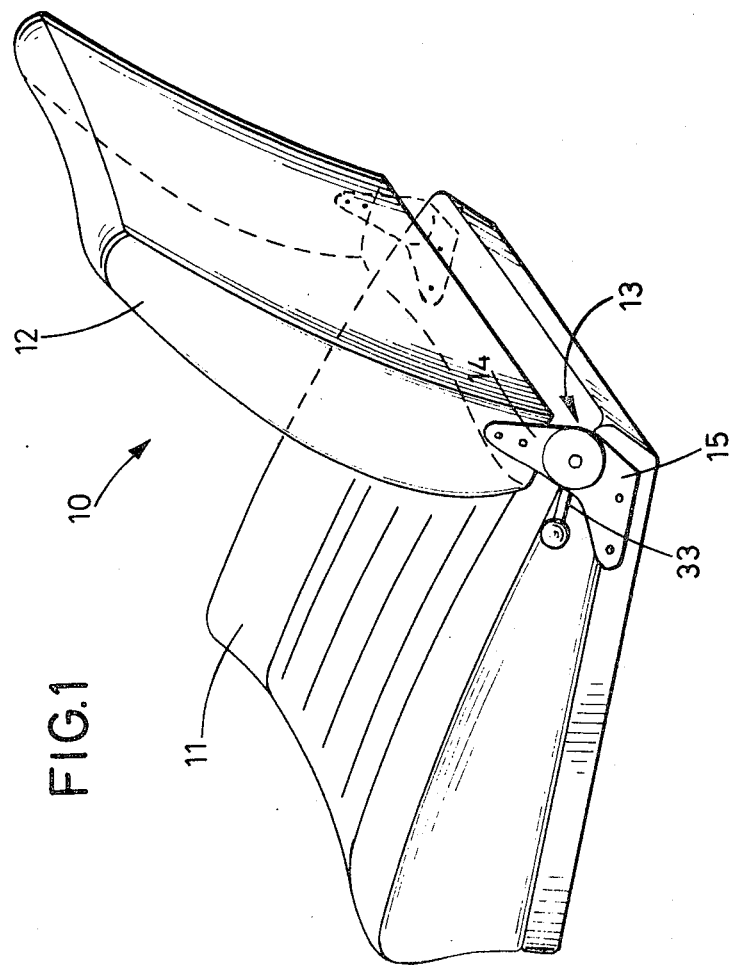

SEAT CONSTRUCTION

BACKGROUND OF THE INVENTION

The present invention relates generally to a seat construction, and more particularly to a seat construction in which a backrest member is angularly adjustable with reference to a seat member. The invention is particularly but not exclusively suitable for use on seals of automotive vehicles.

It is already known from the art to provide such a seat construction in which mounting means mounts the backrest member on the seat member, with one of the members having a ring gear and the other having a spur gear located within the ring gear and meshing with the teeth of the same. The outer diameter of the spur gear is smaller than the root diameter of the ring gear by at least the height of one tooth and the number of teeth on the two gears differs by at least one. This prior-art construction also connects the gears by a shaft which extends at one end into a locking arrangement associated with one of the gears and being radially shiftable relative thereto, with suitable means being provided for effecting such shifting.

In the prior-art construction the journalling element in which one end of the shaft is journalled, that is the shaft which is the common axis for the locking and pivoting components, is constructed as a cam which is radially supported at all sides in the arresting position by appropriate portions of the arrangement. This cam has an edge profile which makes it possible to shift it with reference to the supporting elements into a position in which it is capable of performing free radial movement. Due to the difference between the height diameter of the spur gear and the root diameter of the ring gear the two gears, which are always in engagement with their teeth on part of their respective peripheries, are mounted eccentrically with reference to one another. This makes a relative displacement of the components on which the gears are respectively provided, possible only if the shaft connecting the two gears is capable of moving in an essentric path with reference to one of the gears when the arresting device is disengaged. If this essentric path movement is blocked by the radial arresting of the arresting device, a change in the relative positions by a force directly acting upon the backrest member, is not possible. In the prior art construction, in which the journalling element can always be arrested in only one position with respect to the associated gear, this means that only a incremental adjustment in the position of the backrest member with respect to the seat member is possible, because blocking of the movement can be effected only in a predetermined position of the aforementioned shaft, a position which is determined by the locking or arresting position of the journalling element.

However, incremental changes in the position of the backrest member with respect to the seat member are frequently not considered sufficiently accurate to commit an accommodation of the position of the backrest member to the exact location desired or required by a user of the seat. To overcome this problem the shaft connecting the gears in the prior-art construction is configurated as an eccentric, with the degree of eccentricity corresponding to the difference between the outer diameter of the spur gear and the root diameter of the ring gear. This makes it possible to turn the eccentric in order to permit an additional continuous fine adjustment in the position of the backrest member with respect to the seat member. Here, however, the disadvantage is encountered that separate actuating elements must be provided for the rapid coarse adjustment, that is the incremental adjustment of the position of the backrest member, and on the other hand for the continuous fine adjustment. Needless to say, such separate actuating elements must be separately employed by the user, leading to a rather complicated manner to adjusting the position of the backrest member.

SUMMARY OF THE INVENTION

It is, accordingly, a general object of the present invention to provide an improved seat construction of the type hereunder discussion, which avoids the disadvantages of the prior art.

More particularly, it is an object of the present invention to provide such an improved seat construction in which a rapid and continuous adjustment of the position of the backrest member with reference to the seat member is possible, by a simple direct exertion of force upon the backrest member, utilizing only a single actuating arrangement and being of such construction that the operation is very simple.

In pursuance of these objects, and of others which will become apparent hereafter, one feature of the invention resides in a seat, particularly for automotive vehicles, which briefly stated comprises a seat member, a backrest member and mounting means mounting the backrest member on the seat member with freedom of angular displacement relative thereto. The mounting means includes a ring gear provided on one of the members and having inwardly directed teeth, a spur gear provided on the other of the members received within the ring gear and having outwardly directed teeth meshing with the inwardly directed teeth. The spur gear has an outer diameter which is smaller than the root diameter of the ring gear by at least the height of one tooth and the number of inwardly directed teeth differs from the number of outwardly directed teeth by at least one. An internal chamber is provided in one of the gears and a journalling member is accommodated with radial clearance in the chamber and movable radially therein. The journalling member is smaller than the interior dimension of the chamber by at least the difference between the diameters of the gears.

Pivot means is also provided on the other of the gears and has a portion journalled in the journalling element. Selectively operable locking means is provided, including a plurality of wedge-shaped blocking elements located in the chamber in the radial clearance, and actuating means is operatively associated with the locking elements for displacing the same in the clearance between locking and unlocking positions in which the gears are respectively prevented from and have freedom of relative angular displacement.

In this manner a construction is provided in which only a single actuating means need be operated in order to afford a rapid and continuous adjustment of the position of the backrest member with respect to the seat member. The engagement of the gears with one another need not be interrupted and the operation and handling is not only reliable but also very simple and quick. In order to assure that an immediate blocking of the relative movement of the gears with one another is obtained at all times, and in particular to assure that even under the most adverse circumstances the blocking will be reliable, it is advantageous to configurate both the chamber and the journalling member so as to have polygonal outlines, advantageously quadratic ones, and to have the inclined wedge surfaces of the locking elements face the journalling element, with the locking elements being displaceable in circumferential direction of the chamber. Thus, the journalling element is engaged and supported by the locking elements when the latter are in their locking or arresting position. It is further advantageous for this purpose to arrange the jounralling elements in pairs, with the elements of each pair being displaceable in direction normal to one another.

In order to permit for joint displacement of the locking elements, it is advantageous to provide these locking elements with projections which extend through cutouts in a portion of a wall bonding the chamber, with the cutouts being slot shaped and each following the path of movement of the respective locking elements between locking and unlocking position. The actuating means is advantageously provided in form of a handle or lever having a substantially star-shaped element which is turnably mounted and whose arms each engage one of the projections so that a pivoting movement of the art will move all locking elements via the action of the arms upon the respective projection thereof, between locking and unlocking positions.

It is of course necessary that each locking element will always be moved to its locking position or unlocking position, and not be left intermediate these positions, irrespective of the particular position in which the journalling element which is to be blocked against movement, is located itself. To assure that this can always be guaranteed, it is advantageous to arrange the arms of the star-shaped member so that they engage the respective projections at one side, namely at that side in which the arms — when the level is turned — will displace the projections and thereby the respective locking elements to unlocking position. On the other hand, the other side of the respective projections is advantageously biassed by biasing means to its locking position. This means that when no force is exerted by the lever and the associated star-shaped element upon the projections, that is in the normal condition when the lever is not engaged, the locking elements will be maintained in locking position by the biasing means without having to be in engagement with the associated arms of the star-shaped member. At the same time this measure assures that in the normal position of the lever or handles, that is when the latter is not engaged and turned, the locking elements will always be reliably moved to the locking position.

The lever itself is advantageously mounted on a pivot which is arranged eccentrically with respect to the locking element in that wall portion in which the slots for the projections are also provided. This assures the equal application of force to the projections of all locking elements. For manufacturing reasons it is advantageous to compose the arm of two interengaging parts which are mounted on the pivot adjacent to one another, with one carrying the handle at the other carrying the star-shaped member having the arms which engage the projections.

The biasing means acting upon the projection advantageously springs and preferably volute springs whose coiled center portion is engaged by suitable holding portions whereas the two arms respectively abut one of the projections and a stationary abutment. This means that each of the locking elements can be reliably biassed independently of any other locking element, towards its locking position, and that the amount of space required for the biasing means is kept to a minimum.

It is further advantageous to provide the chamber in a cage plate associated with the annular or ring gear, and to close the opposite ends of the chamber on the one hand by the spur gear and on the other hand by the cover plate. This not only assures a simple construction of the arrangement, but also guarantees a simple and therefore time and labor-saving assembly of the various components. The cage plate is advantageously connected with the ring gear and with the cover plate by connecting elements which at the same time form the holding members on which the coiled center portions of the volute springs are mounted. These connecting portions may be of rivet-like configuration. The connecting axis of the gears, that is the pivot axis for them, can be produced in a particularly simple manner by deforming an appropriate portion of the spur gear so that this portion can act as the pivot. The connection of the mounting components respectively is secured to the seat member and to the backrest member, and provided with the spur gear and the ring gear, respectively, that is the connection of the gears with the mounting components and with one another, is advantageously effected by guide lugs which are provided on the mounting components and which each embrace edge portions of the other mounting component, whereby a reliable connection of the various components is assured which nevertheless permits relative displacement with little exertion of force.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view illustrating an embodiment of the present invention;

FIG. 3 is a section taken on line III—III of FIG. 2; and

DESCRIPTION OF THE PREFERRED EMBODIMENTS

Figure 2:
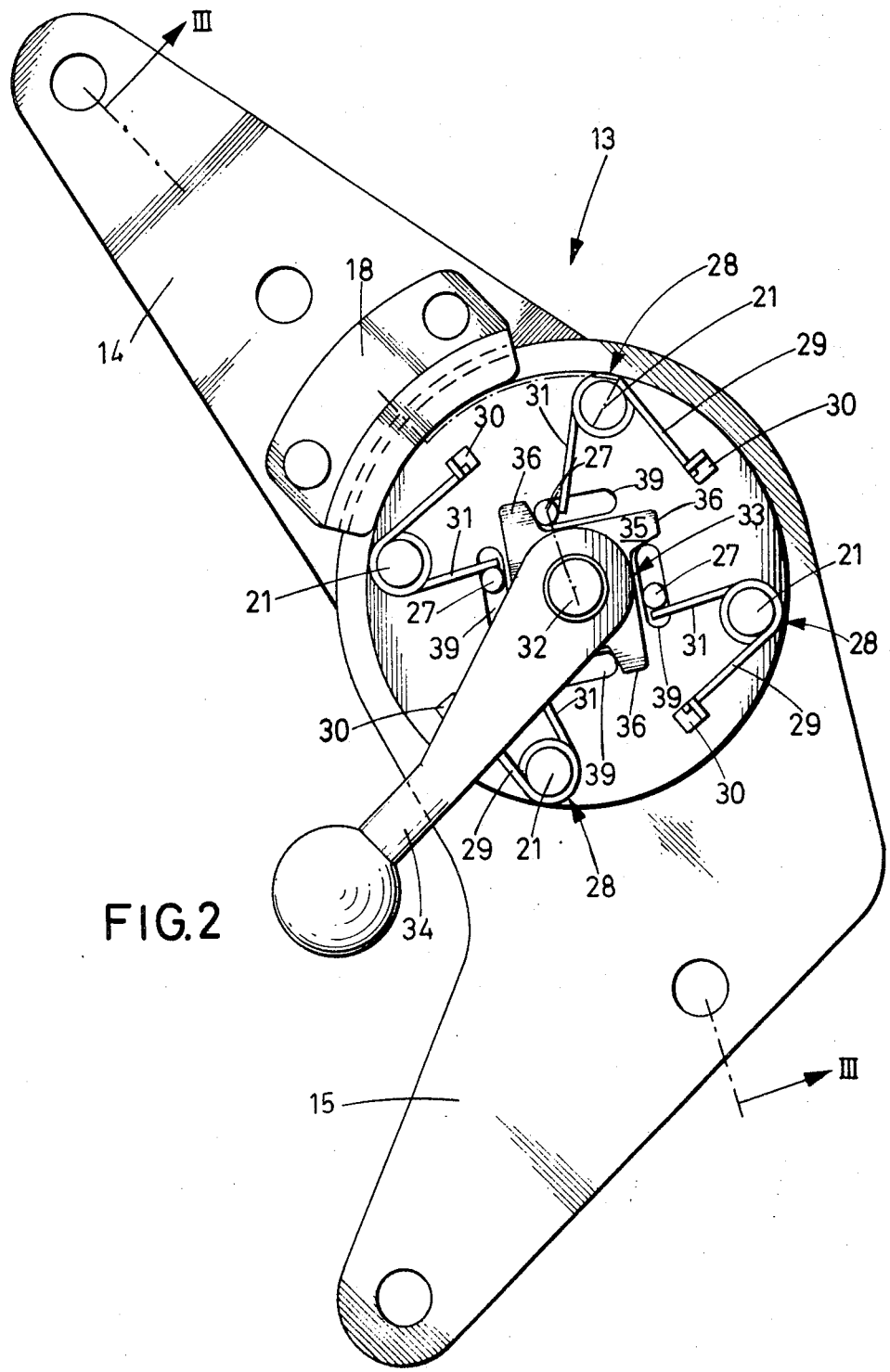
FIG. 2 is a detail view, on an enlarged scale, illustrating a detail of the embodiment in FIG. 1.

Discussing the drawing now in detail it will be seen that in FIG. 1 I have illustrated a seat 10 having a seat member 11 and a backrest member 12. The backrest member 12 is connected with the seat member 11 and is to be angularly displaced with reference thereto between a plurality of positions, so that the inclination of the backrest member 12 can be adjusted to suit the needs and/or comfort of a user of the seat.

The connection between the members 11 and 12 is affected by a pair of mounting means located at opposite lateral sides of the members 11 and 12 and connecting the same together as shown. One of these mounting means, and it is assumed herein that it is the one shown in broken lines in FIG. 1, can be a simple hinge of the type which is well known for such purposes. The other mounting means is identified with reference numeral 13 and embodies the present invention.

The mounting means 13 has a mounting portion 14 which is connected with the backrest member 12 and a second mounting portion 15 which is connected with the seat member 11. This basic concept is, of course, well known and can be employed not only in vehicle seats, such as an automotive vehicle seat, but also in other types of seats.

Figure 4:
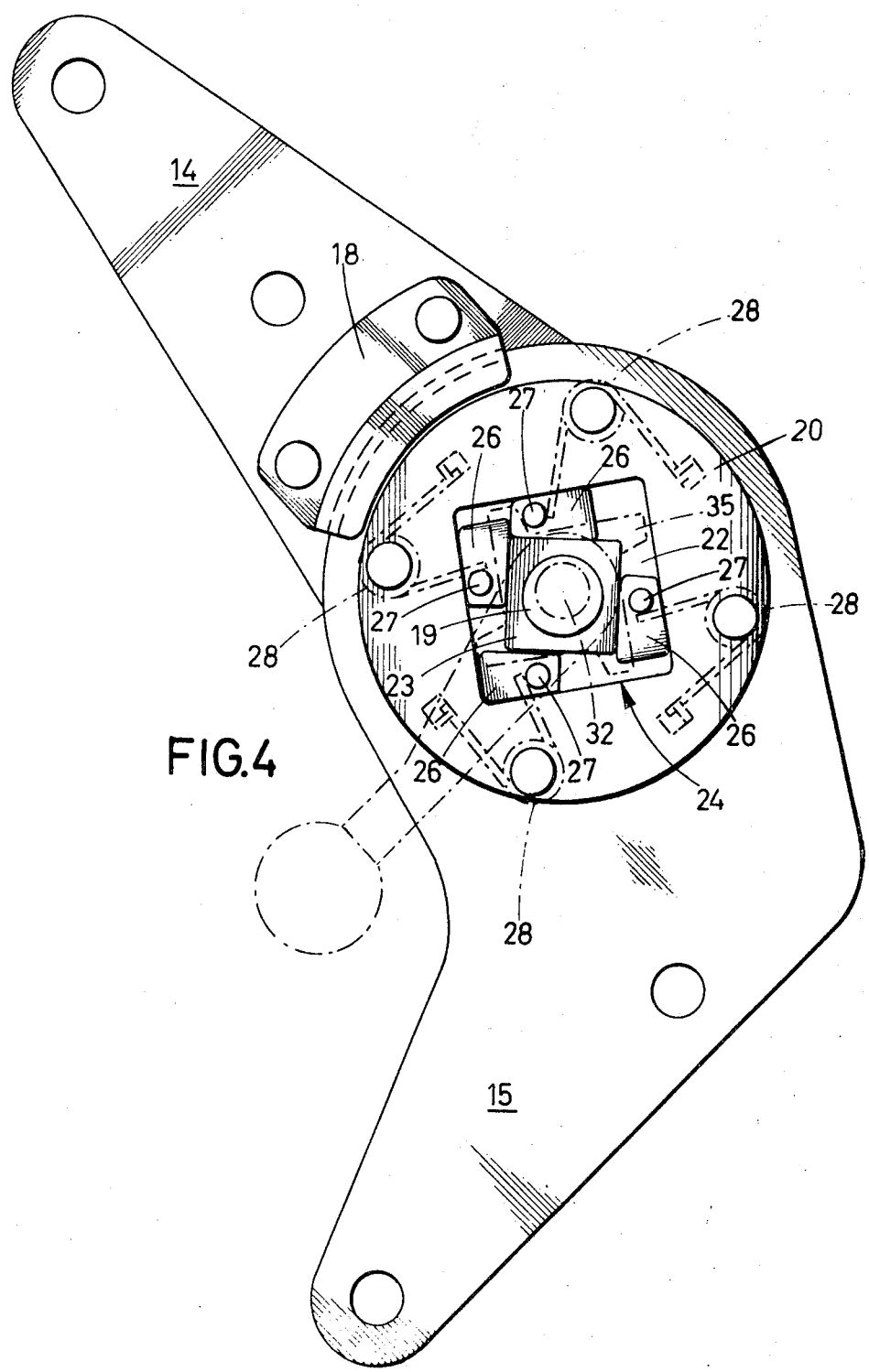
FIG. 4 is a view similar to FIG. 2 but with portions removed to show underlying elements.

Details of the construction of the mounting means 13, which make possible a desired angular adjustability thereof and therefore of the backrest member 12 with reference to the seat member 11, are illustrated in FIGS. 2–4. It will be seen from these Figures, and in particular from FIG. 3, that a spur gear 16 is fixedly connected with the element 14, engaging in or with the teeth of a ring gear 17 which is provided on the mounting element 15. The axial retention of the gears with reference to one another, to assure that their meshing teeth cannot move out of engagement by relative axial displacement, is effected by means of retaining lugs 18 which are provided on the respective elements 14 and 15, for instance by screw threaded or other means, and which each have an offset position which overlaps and embraces a portion of the respectively other element, that is if the lugs are present on the element 14 they will engage the element 15, and vice versa.

The outer diameter of the spur gear 16 is smaller than the root diameter of the ring gear 17 by at least the height of one tooth. The number of teeth on the gears 16 and 17 also differs by at least one. This construction assures that the teeth of the gears 16 and 17 engage with one another only over a portion of the respective periphery of the gears, whereas on that portion of the respective periphery which is opposite the portion of engagement the teeth are not in mesh. This means that a relative angular displacement of the elements 14 and 15 can take place only as a result of relative turning movement of gears 16 and 17 with the portion in which the engagement of their teeth takes place, shifting around the periphery as a result of such movement. This means that the teeth of successive peripheral portions of the gears 16 and 17 successively move into mesh and out of mesh and that the spur gear 16 is eccentrically displaced with reference to the ring gear 17. When the elements 14 and 15 are angularly displaced with one another by the amount of the tooth difference existing between the number of teeth of the gear 16 and the number of teeth of the gear 17, the spur gear 16 will perform a complete eccentric movement with reference to the gear 17. A displacement of the elements 14 and 15 beyond this point thus will cause a multiple eccentric movement of the spur gear with reference to the ring gear.

A pivot 19 also connects the gears 16 and 17, in addition to their connection by interengagement of their respective sets of teeth. This pivot is here provided by deforming a portion of the spur gear 16 so that this portion can act as a pivot, being designated with reference numeral 19 and extending with its free end into a plate 20 which is connected via bolts, rivets or the like 21 at several locations so as to be fast with the gear 17 or in a larger sense with the element 15. The plate 20 is provided with an approximately central recess forming a cage-like chamber or space 22 for a journalling element 23 at in which a portion of the pivot or shaft 19 is journalled.

There is further provided a locking arrangement, which is also accommodated in the chamber 22, having a plurality of locking elements and permitting locking of the element 23 with respect to the plate 22, and therefore with respect to the ring gear 17, against movement. The chamber 22 is closed in axial direction at one side by the abutting gear 16 itself, and at the other side by a cover plate 25 which is connected with the plate 20 and the gear 17 (and therefore with the element 15) to form a rigid unit, the connection being effected via the aforementioned bolts or rivets 21.

Reference to FIG. 2 will particularly clearly show the appearance of the construction thus far described when the plate 25 is in position, and reference numeral 4 shows the construction of FIG. 2 but with the plate 25 removed to show the underlying components, with the elements connected with the plate 25 or located outside the plate 25 (with reference to the chamber 22) being shown in broken lines for purposes of orientation.

It will be understood that, as has been previously pointed out, a configuration of the outlines of the chamber 22 and of the element 23 in polygonal contour is particularly advantageous. The contour currently considered to be the most advantageous one and illustrated in the drawing, is quadradic for both the chamber 22 and the element 23. The chamber 22 is larger dimensioned than the element 23 by at least the difference between the diameter of the gear 16 and the inner diameter of the gear 17. The element 23 is turnably mounted on the pivot or shaft 19 and is surrounded by wedge-shaped locking elements 26 of the locking arrangement.

The locking elements 26 have wedge-shaped inclined side faces which face towards the element 23. The elements 26 are located in the remaining clearance between the element 23 and the plate 20 and are arranged in pairs, with the elements 26 being shiftable relative to one another in mutually normal directions. Projections 27 are provided on the respective elements 26 and extend into and through slot-shaped cutouts 39 of the plate 25 the direction of the cutouts corresponding to the direction of movement in which the elements 26 are displaced between locking and unlocking positions. Biasing means, here illustrated as volute springs 28, engage the projections 27, urging them in a sense maintaining the elements 26 in arresting position or tending to restore them to such position. The volute springs 28 have a convoluted center portion which is engaged by and retained by the bolts 21, whereas one of the arms 29 of the respective springs engage an abutment 30 provided for this purpose on the plate 25 while the other arm 31 of the same spring engages one of the projections 27 under pretension. The invention further provides for a turnable bolt 32 which is mounted in the plate 26 centrically with respect to the ring gear 17. An actuating element 33 is turnably mounted on the bolt 32 and composed essentially of a lever 34 and a substantially star-shaped member 35 which is connected with the lever 34 so as to be turnable with but not relative to the same. The element 35 has a plurality of arms 36, one for each of the projections 27. These arms each engage one of the projections 27 at a side thereof remote from the side where the same projection is engaged by the arm 31 of one of the springs 28. This means that when the lever 34 is moved in a sense turning the element 35, the arms 36 will displace the locking elements 26 via the respective projections 27 in direction counter to the biasing force of the springs 28. In the illustrated embodiment, for instance as shown in FIGS. 2 and 4, this means that the elements 26 will be displaced in clockwise direction, jointly, to reach an unlocking position in which they release the journalling element 23 for movement. The non-rotatable connection of the elements 34 and 35 is effected in the illustrative embodiment by engagement of projections 37 of the element 35 into appropriate recesses of the element 34.

It will be appreciated from what has been set forth above that, given the fact that a relative displacement of the gears 16 and 17 can take place only when the engagement of the teeth of the gear shifts incrementally about their circumference, that the necessary eccentric displacement of the gear 16 with reference to the gear 17 which is required to permit such shifting and relative displacement can take place only when the gear 16 is given the opportunity for eccentric displacement relative to the gear 17. This means that the pivot 19 which is fast with the gear 16 must be capable of performing an eccentric displacement, which requires that the element 23 have freedom of radial movement. When the elements 26 are in the arresting position to which they are permanently urged by the springs 28, and in which they are shown in FIGS. 2 and 4, the element 23 with the pivot 19 journalled therein, and thereby the gear 16, cannot perform such movements because the element 23 is engaged by the wedge surfaces of the elements 26 whose opposite surfaces engage the plate 20. Relative turning movement of the gears 16 and 17 is therefore not possible and the gears, and thereby the elements 14 and 15 as well as the members 11 and 12, are locked against relative angular displacement. On the other hand, if and when the elements 26 are shifted out of the positions shown in FIGS. 2 and 4, counter to the urging of the biasing springs 28 and into a position in which the elements 23 has sufficient freedom of radial displacement to permit the necessary eccentric movement of the pivot 19 and of the gear 16 with respect to the gear 17, then a relative angular displacement of the elements 14 and 15, and thereby of the members 11 and 12, becomes possible. Inasmuch as the wedge-shaped elements 26 have been given this particular configuration, they can become effective for locking purposes depending upon the location of the element 23, when the actuating device is released, that is when the user does not displace it. They can perform such function independently of one another, if they are returned from release position by different distances towards the arresting position. This makes possible an arresting of the radial movement of the element 23 in any desired phase of the eccentric movement of the gear 16 with reference to the gear 17, so that an arresting of such movement can be effected independently of which particular region of the teeth on the peripheries of the two gears are in engagement with one another at a given time. Thus, a continuous adjustment of the angular position of the elements 14 and 15 — and thereby of the members 11 and 12 — relative to one another is possible, with subsequent arresting of the elements relative to one another in any desired and selected position.

It should be appreciated that the illustrated embodiment is exemplary only and is not intended to be limiting in any sense. It will be evident that various modifications and changes are possible. For instance, the mounting element which is connected with the ring gear 17 or a bearing member associated with the ring gear 17 could be fixedly connected with the pivot 19 if desired, whereas the radially freely movable element 23 as well as the arresting means would then be provided on the spur gear or in a component fixedly connected with the same. It is also possible to configurate the element 23 of a polygonal contour other than the quadradic one shown in the drawing, and similarly to change the contour of the chamber 22. In this case the number as well as the outline of the locking elements 26 would also have to be appropriately changed. The elements 26 could for instance be configurated as rounded wedges and could have a cylindrical or even a spherical configuration as long as the necessary locking effect is obtainable. Evidently, it is also possible to reverse the connection of the gears 16 and 17 with the respective elements 14 and 15 from what has been illustrated.

It will be understood that each of the elements described above, or two or more together, may also find a useful application in other types of constructions differing from the types described above.

While the invention has been illustrated and described as embodied in a seat, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A seat, particularly for automotive vehicles, comprising a seat member; a backrest member; mounting means mounting said backrest member on said seat member with freedon of angular displacement relative thereto, said mounting means including a ring gear provided on one of said members and having inwardly directed teeth, a spur gear provided on the other of said members received within said ring gear and having outwardly directed teeth meshing with said inwardly directed teeth, said spur gear having an outer diameter which is smaller than the root diameter of said ring gear by at least the height of one tooth and the number of inwardly directed teeth differing from the number of outwardly directed teeth by at least one; an internal chamber provided in one of said gears; a journalling member accommodated with radial clearance in said chamber and movable radially therein, said journalling member being smaller than the interior dimension of said chamber by at least the difference between the diameters of said gears; pivot means rigid with the other of said gears and having a portion journalled in said journalling element for movement therewith; selectively operable locking means including a plurality of wedge-shaped locking elements located in said radial clearance and normally engaging said journalling element for preventing radial movement of the same and relative angular displacement of said gears; and actuating means connected with said locking elements for displacing the same in said clearance to an unlocking position in which said locking elements are out of engagement with said journalling element so as to permit radial movement of the same and relative angular displacement of said gears.

2. A seat as defined in claim 1, wherein said chamber and said journalling element, respectively, are of polygonal outline.

3. A seat as defined in claim 2, said locking elements being displaceable in circumferential direction of said chamber and having inclined wedge faces which are directed towards said journalling element.

4. A seat as defined in claim 1, said locking means comprising at least two of said locking elements which are arranged for displacement in mutually normal direction.

5. A seat as defined in claim 1, further comprising wall means partially bounding said chamber and having an outer side, said wall means being provided with guide slots open to said chamber and to said outer side; said locking elements each comprising at least one projection which extends into a respective guide slot and outwardly beyond said outer side; and wherein said actuating means includes a turnable element located at said outer side and having respective arms each of which engages one of said projections at said outer sides.

6. A seat as defined in claim 5, said locking elements each being movable between a first and a second position in which they respectively prevent and permit relative angular displacement of said gears; further comprising biasing means acting upon the respective projections for urging the associated locking elements to said first positions thereof; and wherein said arms of said turnable element are operative for displacing said locking elements to said second positions thereof in response to requisite turning of said turnable element.

7. A seat as defined in claim 5, further comprising a pin carried by said wall means and extending centrically with reference to said locking elements; and wherein said turnable element is mounted on said pin for turning movement about the longitudinal axis thereof.

8. A seat as defined in claim 7, said turnable element comprising two interengaging components mounted adjacent one another on said pin, one of said components being provided with an engaging handle and the other of said components having said arms.

9. A seat as defined in claim 6, said biasing means being volute springs each having a convoluted center portion and a pair of arm portions extending from said center portion, one of said arm portions of each of said springs abutting one of said projections; further comprising stud portions received in the respective coiled end portion; and fixed abutment portions each engaging the other arm of the respective spring.

10. A seat as defined in claim 6, said ring gear including a plate portion provided with said chamber, and said chamber having two opposite oben sides, said spur gear extending across and closing one of said sides; and further comprising a cover plate extending across and closing the other of said sides.

11. A seat as defined in claim 9, said ring gear including a plate portion provided with said chamber, and said chamber having two opposite open sides; spur gear extending across and closing one of said sides; further comprising a cover plate extending across and closing the other of said sides; and wherein said stud portions connect said plate portion, said ring gear and said cover plate with one another.

* * * * *